United States Patent [19]
Frers

[11] Patent Number: 5,750,880
[45] Date of Patent: May 12, 1998

[54] VEHICLE HARMFUL GAS DETECTION APPARATUS

[75] Inventor: Klaus Dieter Frers, Delbruck, Germany

[73] Assignee: Auto Electronics Corporation, Seoul, Rep. of Korea

[21] Appl. No.: 766,911

[22] Filed: Dec. 13, 1996

[30] Foreign Application Priority Data

Dec. 15, 1995 [DE] Germany .................. 295 19 940.7

[51] Int. Cl.$^6$ .................................................. G01N 37/00
[52] U.S. Cl. .................................... 73/31.02; 73/31.05
[58] Field of Search .............................. 73/31.01, 31.02, 73/31.03, 23.34, 23.2, 31.05, 31.06; 338/34, 226, 276; 422/83, 88, 90; 340/425.5, 438, 632, 634

[56] References Cited

U.S. PATENT DOCUMENTS 4,597,850   7/1986   Takahasi et al. .............. 73/31.05 X
5,294,048   3/1994   Kawasaki ..................... 73/31.02 X
5,624,639   4/1997   Ariga et al. ...................... 422/83

FOREIGN PATENT DOCUMENTS 3524233   1/1987   Germany ...................... 73/31.02

Primary Examiner—Michael Brock
Attorney, Agent, or Firm—Rader, Fishman & Grauer PLLC

[57] ABSTRACT

An apparatus, for use in vehicles, for detecting a harmful gas material surrounding the apparatus to then adequately ventilate a surrounding air comprises a case which is equipped with a sensor utilizing an electric measuring device. The sensor, in contact with a surrounding air through an air passage, is mounted on a connection portion of an electric circuit board and is protruded from the case to a chamber. The chamber has a set of holes and is formed on a case cover, the set of holes of the chamber being provided with a set of corresponding filters. The air passage is formed between an inner and an outer walls of a case cap covering the chamber.

12 Claims, 3 Drawing Sheets

5,750,880

VEHICLE HARMFUL GAS DETECTION APPARATUS

FIELD OF THE INVENTION

The present invention relates to an apparatus for detecting a harmful gas material in or outside vehicles therefor and, more particularly, to an apparatus which can be implemented in a simplified assemble procedure and is capable of effectively sensing the harmful gas material, to then ventilate surrounding air.

DESCRIPTION OF THE PRIOR ART

There has been disclosed a sensor in DE. Pat. No. 44 14 594, which controls a ventilating operation by sensing harmful materials among surrounding air in case of a ventilating device for use in vehicles, wherein a zinc-oxide vapor sensor has been employed as the sensor so as to sense the harmful material in the surrounding air. Such sensors detects gasoline and diesel exhaust fumes jetted from gasoline and diesel vehicles through the use of a particular measuring technique.

When the level of a detected exhaust fume exceeds a predetermined level, the ventilating device incorporating the sensor inside the vehicles is automatically activated so as to ventilate the surrounding air. Such ventilating device have been widely utilized in various automobiles providing high level of comfort.

For example, a gas detection apparatus whose sensor is mounted within a capsule covered with a metal lattice is being used in BMW company. The capsule is disposed at the rear of a woollen filter and the surrounding air is contacted with the sensor through the woollen filter. In such conventional apparatus, however, solid fine particles still remain around the sensor to thereby render it to degrade the sharpness of sensing of the sensor.

Further, a gas detection apparatus fabricated by Bosch company is operated using two sensors for separately sensing gasoline and diesel exhaust fumes. Each of the sensors of the apparatus is covered with a Teflon tube for passing vapor, the Teflon tube being inserted into and mounted within a metal tube which is provided with a number of air passages. In addition, these tubes are fixed within a case including an electric measuring apparatus, apparatus generates a control signal for controlling the ventilation arrangement.

However, the afore-described conventional gas detection apparatus suffers from shortcomings that it is structurally complicated due to utilization of two sensors, and hence, it results in increment of manufacture cost.

SUMMARY OF THE INVENTION

It is, therefore, a primary object of the invention to provide an apparatus which is capable of being implemented in simplified assemble procedure and effectively detecting a harmful gas material existing in vehicles or outside, to thereby ventilate surrounding air.

In accordance with a preferred embodiment of the invention, there is an advantage that a chamber incorporating a sensor therein is installed on a case cover to achieve a reduced size and a secured structure. In such structure, the sensor may be stably protected from, for example, an impact or a harmful material and also easily in contact with the surrounding air. Further, the invention installs the sensor on a sub-circuit board and achieves connection between the sub-circuit board and a main circuit board with the help of solder. In this case, if the connection portion is formed as a part of the circuit board, the sensor is installed on the connection portion of the circuit board including an electric measuring device, to thereby render it to electrically connect the sensor with the electric measuring device.

In the present invention, the main circuit board is mounted within the case, and the sensor is protruded from the case so as to insert into the chamber of the case cover, during covering the case with the case cover. Thereafter, through one of a pair of holes formed on the case cover, the case is filled with a solidification liquid synthetic resin to thereby securely fix the case cover to the case. Thus, while the inner portion of the case is sealed together with the main circuit board, the sensor included in the chamber is positioned at the outside of the sealed case.

Moreover, in order to protect the sensor against fine particles in the air which may enter inside the engine in vehicles, the present invention employs a filter for protecting the sensor, the filter being formed in an accumulated layer structure fabricated in a conventional pad form. In the invention, the filter is formed in a thin plate manufactured by using a composite material composed of Gore-Tex. The thin plate filter is also covered with a thin film Teflon as a second layer to thereby pass only vapor except humidity.

According to a preferred embodiment of the present invention, the thin plate filter is further covered with a metal knitting or a metal textile as a third layer on the outside thereof. The third layer for the filter is used in protecting physically the inner layers, and hence, suppressing an error occurring because of the temperature change of the sensor irrespective of harmful gas materials in the among air. Specifically, the metal knitting is used for cutting the sensor heated up to an actuating temperature off outside temperature through the use of thermal inertia.

Furthermore, enhancement of such temperature cut off effect is achieved by close connection between the metal knitting layer and another layers. The thin plate, i.e., the pad, which is fabricated by using the aforementioned composite material of Teflon or Gore-Tex, may be disposed on two side holes of the chamber in such a manner that the pad is located at, the edge of the holes by bonding. In installing the metal knitting on the chamber, it preferably bends one sheet of metal knitting into an U-shaped form to install along outer surface of the chamber. However, such installation method has a drawback that when the case cap is fixed on the case the metal knitting is severely pressed.

Further, the present invention has a band which encompresses the chamber included in the case cover to seal tightly up the case with respect to the chamber incorporating the sensor therein. Then, the band is immersed in the solidfiable liquid synthetic resin by the case cover, wherein the connection portion is protruded from the case filled with the synthetic resin.

Accordingly, a slight gap between the outer surface of chamber and the case is sealed up by being solidified through the solidification of the liquid synthetic resin. In that case, by regulating a height of the band, a charge acceptable error, i.e., a horizontal height of the solidifiable liquid synthetic resin during sealing up may be processed smoothly. As a result, an air gap existing in upper portion of the case is separated from the chamber with the help of the band to thereby maintain constantly a predetermined volume. Likewise, the case cover is provided with a flange which is used to tightly fix the cover to an inner surface of the case, wherein the flange travels along an inner wall of the case to the inner portion thereof and is surrounded with the solidifiable liquid synthetic resin fed thereto. Thus, the flange of the case cover is fixed on the case by being solidified the liquid synthetic resin. Moreover, since a pair of holes is formed on two sides of the chamber, the remaining air in the case is forced from the case during the filling of the solidifiable liquid synthetic resin into the case.

In accordance with a preferred embodiment of the present invention, there is preferably provided a case cap so that the surrounding air is ventilated around the sensor included in the chamber and the sensor is protected from an undesired condition, e.g., impulse, impact and a jet material generated from the engine installation part of the vehicles. Since the inner portion of the case cap is formed as a labyrinthine air passage, the invention allows the surrounding air to uniformly circulate through the air passage around the sensor and prevents the jet material from passing to the sensor. In addition, the air passage serves to insulate the inner and the outer of the chamber from the temperature changes. The air passage may be implemented by forming an inner structure of the case cap into a double-wall, i.e., an inner wall and an outer wall, wherein the inner and the outer walls are connected with each other through a connection frame.

Specifically, the air passage becomes a space between the inner and the outer walls wherein each of the walls is provided with a plurality of slots which is alternatively offset. An inner structure of the inner wall is formed so that connection between the inner portion of the cap and the outer surface of the chamber can be performed when the cap is mounted on the cover. In an injection aspect, the frame and the slots formed on the inner and the outer walls are preferably positioned in an axial and transversal directions, respectively. The case, the case cover and the cap may be primarily made of synthetic resins through the use of an injection mold technique.

In addition, the present invention employs a zinc-oxide sensor which is able to be heated up to an actuating temperature sufficient enough for the sensor to sense reducible and oxidable gases.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
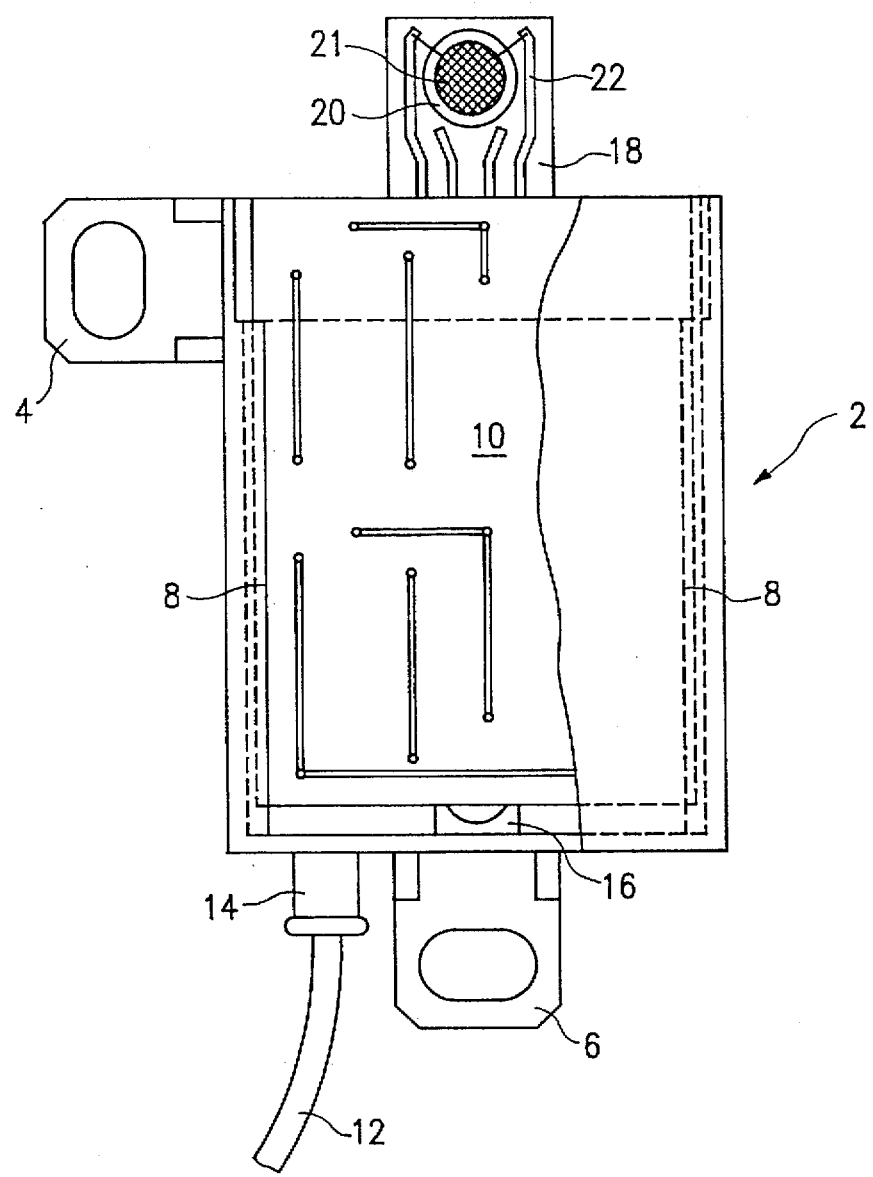
FIG. 1 depicts a schematic block diagram of the gas detection apparatus in accordance with a preferred embodiment of the present invention.

Referring to FIG. 1, there is presented a schematic block diagram of a case of the gas detection apparatus in accordance with the present invention, which includes a circuit board 10, a cable 12 for receiving and transmitting a data, a pair of plates for attaching the case on a pertinent position in vehicles and a sensor 21.

The circuit board 10 composed of a plurality of electrical elements is installed within the case 2. Specifically, the circuit board 10 travels to an inner portion of the case 2 along a side inducing line 8 until it reaches a stopper 16 to be mounted thereon, and also coupled to the cable 12, the cable 12 being attached to a controller(not shown) for controlling a ventilating device or an air regulating device in the vehicles. In this case, the cable 12 is tightly fixed by a cable support member 14 to thereby obtain a stable support thereof. Also, a connection portion 18, which is provided with four conductive lines 22 and a sensor install portion 20 for installing the sensor 21, is protruded from the case 2. The four conductive lines 22 are coupled with the sensor 21, electrical elements and thermal components used for obtaining a required actuating temperature. Further, the connection portion 18 may be composed of a sensor circuit board with a reduced size which is electrically and mechanically connected with the circuit board 10. The connection portion 18 may be also a portion of the electrical circuit board.

Figure 2A:
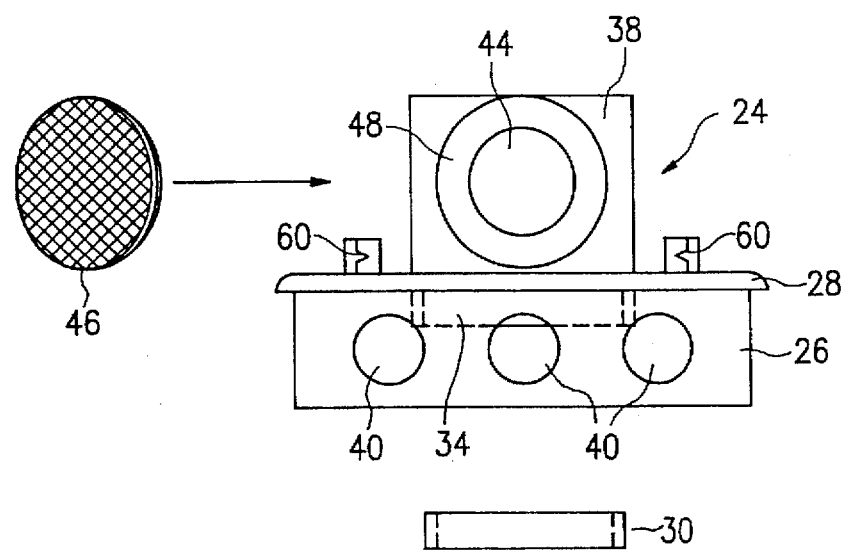
FIGS. 2A and 2B present a detailed side elevational and a detailed fragmentary plan views of a case cover in accordance with a preferred embodiment of the present invention, respectively.
Figure 2B:
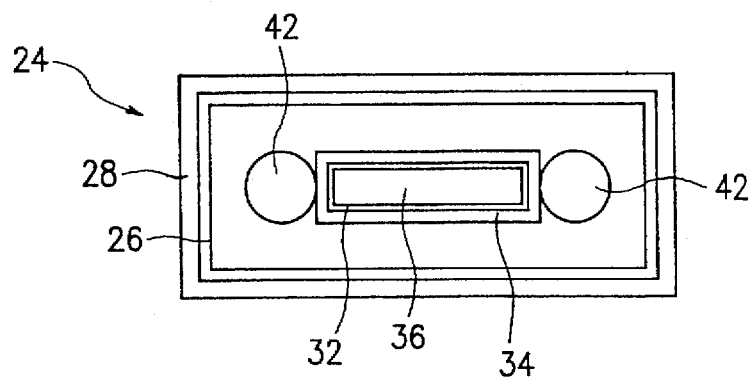

As an edge portion 28 of a case cover 24 reaches an upper edge of the case 2, a flange 26 of the cover 24 is inserted into inside of the case 2 to close an opened part of the case 2, as shown in FIG. 2A. In FIG. 2A, a rectangular-shaped shielding member 30 is designed so that it matches with the connection portion 18 and is adapted to be put into a corresponding recess 32 in the case cover 24, the recess 32 being therefor formed by a band 34 which is protruded toward inside of the cover 24.

Specifically, the recess 32 is provided between a hole 36 and the band 34 to obtain a tight sealing between the case 2 and the cover 24. The shielding member 30 is utilized for regulating an allowable error, i.e., an air gap, between cross sections of the connection portion 18 and that of the hole 36 on a chamber 38. Furthermore, the shielding member 30 serves to protect the sensor 21 against soldering vapor occurred during soldering connection portion 18 to the circuit board 10.

The flange 26 in the cover 24 is provided with a plurality of holes 40. For this reason, when the case 2 is covered by the case cover 24 and a solidifiable liquid synthetic resin is filled in the sealed case 2, the plurality of holes 40 are filled with the synthetic resin to thereby allow it to achieve a tight junction between the cover 24 and the case 2.

During filling the solidifiable liquid synthetic resin into the sealed case, two holes 42 are formed on the cover 24 in order to force the air occurring during the above filling from the inside of the case.

Holes 44 are made on two opposite sides of the chamber 38 in such a way as to correspond to the sensor install portion 20 of the connection portion 18 when the connection portion 18 is mounted inside the chamber 38 and thereby to make it possible for surrounding air to pass around the sensor 21.

In order to protect the sensor from pollution, two sides corresponding to each of the holes 44 are equipped with two filters 46 each of which is inserted into a groove 48 formed around the holes 44 and fixed therein. In this case, the filters 46 may be attached to the groove 48 with the help of a bonding agent.

The filter 46 may be made from a conventional composition material in a thin plate form through the use of an injection molding technique, wherein the thin plate is formed by accumulating Gore-Tex layer covered by a thin film Teflon. The Teflon material is preferably used for ventilating the surrounding air around the sensor 21 with the help of ventilative performance during extension thereof.

The composition materials serve to prevent humidity from contacting with the sensor 21 and to allow vapor to apply to the sensor 21.

Moreover, a metal knitting or a metal textile fabric as an outer layer of the filter 46 may be employed to prevent fine particles exerting a harmful effect on the permeability of the thin plate filter, from contacting with the thin plate filter. While the thin plate made of double-layer is fixed within the groove 48 and then the Teflon side is oriented toward the sensor, the metal knitting is provided along the edge portion of the chamber 38. Accordingly, when a cap 50 is overlapped with the cover 24, each of the metal knitting is positioned at a predefined location.

Figure 3A:
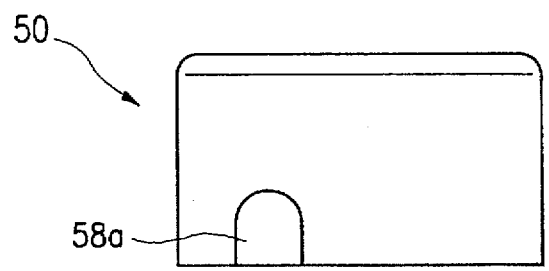
FIGS. 3A and 3B represent a detailed side elevational and a detailed fragmentary plan views of a case cap in accordance with a preferred embodiment of the present invention, respectively.
Figure 3B:
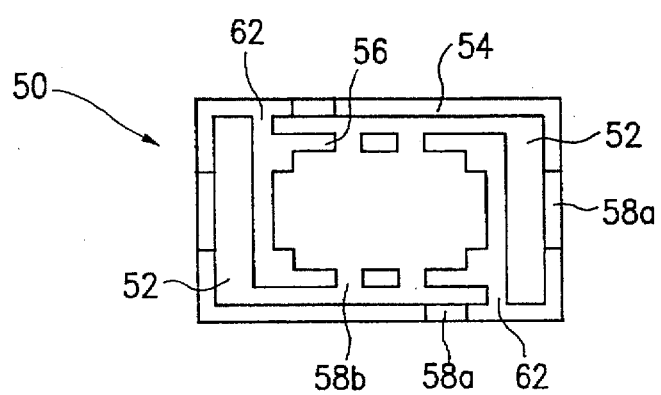

In accordance with a preferred embodiment of the present invention, the filter can be implemented by using a classical composition materials and the metal knitting, especially without using triple-layer composition materials. As shown in FIGS. 3A and 3B, there are illustrated a side elevational and a fragmentary plan views for depicting the inner structure of the case cap 50 in accordance with the present invention.

In FIG. 3B, a labyrinthine air passage 52 is provided between an outer wall 54 and an inner wall 56 in the case cap 50. Four slots 58a are formed on four sides of the outer wall 54, respectively, to thereby make it possible for the surrounding air to enter therethrough into the air passage 52. Similarly, the inner wall 56 is provided with four slots 58b, each of which is positioned in such a way that it is offset with respect to the slots 58a of the outer wall 54. For this reason, the air passing through the slots 58a first enters the air passage 52 and then comes to the slots 58b through the air passage 52, and subsequently reaches the sensor 21 via the hole 44 and the filter 46 thereat. By using such air flow, an adiabatic effect between the inner portion of the chamber 38 and the outer portion may be successively obtained.

Accordingly, even if a temperature of the surrounding air is altered, the operation temperature of the sensor 21 is constantly maintain to thereby allow it to suppress generation of an error signal involved in the sensor 21. Connection between the walls 58a and 58b is achieved using a connection frame each other to fix lower these walls.

As depicted in a dot line shown in FIG. 2A, an inner rectangle of the cover 24 is matched with an outer cross section of the chamber 38 to tightly mount the cover 24 on the case 2. Further, as shown in FIG. 2A, two stoppers 60 are provided at a position adjacent to the two sides of the chamber 38 in a width direction, respectively. Each of the stoppers 60 is intended to be inserted into is inserted to the air passages 52 positioned at a width direction of the cap 50 when the cap 50 is disposed on the case cover 24, and subsequently engaged with a projecting part(not shown) formed within the cap 50 when the cap 50 reaches a predetermined position on the cover 24, to thereby achieve a tight connection between the cap 50 and the cover 24.

During the assembling of the inventive gas detection apparatus, the cable 12 first is inserted into the cable support member 14 to lead to outside, and simultaneously the circuit board 10 is mounted within the case 2 along the side inducing line 8 until it reaches the stopper 16 provided at the bottom of the case 2. Thereafter, the cover 24 is mounted on the top of the case 2 the flange 26 of the cover 24 being tightly inserted into the case 2 until the edge portion 28 is matched with the upper edge of the case 2.

Next, the case 2 is filled with the solidifiable liquid synthetic resin through one of the holes 42 in the case cover 24. After some time, the circuit board 10 and component elements thereof are completely covered with the resin. At this moment, air presented within the case 2 escapes out of the case through the other hole 42 in the case cover 24. The band 34 and the shielding member 30 also allow the solidifiable liquid synthetic resin to seal up all the filled elements and hence the case cover. After the solidification liquid of the synthetic resin and after the thin plate filter 46 is covered with the metal knitting discussed above, the cap 50 is inserted into the cover 24 until the stoppers 60 of the cover 24 are engaged with the projecting part (not shown) of the cap 50. Thus, assembling of the inventive apparatus is successively completed to thereby making it possible to test the sensor.

It will be apparent that the invention, as demonstrated above, is capable of being implemented in the simplified assemble procedure, and hence, it adaptively reacts against a harmful gas material, to thereby effectively sensing the harmful material surrounding the apparatus, resulting in a preferable ventilation.

While the present invention has been described with respect to the particular embodiments, it will be apparent to those skilled in the art that various changes and modifications may be made without departing from the spirit and scope of the invention as defined in the following claims.

What is claimed is:

1. An apparatus, for use in vehicles, for detecting a harmful gas material surrounding the same to then adequately ventilate a surrounding air, said apparatus comprises a case which is equipped with a sensor utilizing an electric measuring device, wherein the sensor is in contact with the surrounding air through an air passage and is mounted on a connection portion of an electric circuit board and is protruded from the case to a chamber, wherein the chamber has a set of holes and is formed on a case cover, wherein the set of holes of the chamber is provided with a set of filters corresponding thereto, wherein the chamber is covered with a case cap which is provided with an outer wall and an inner wall, the air passage being formed between said inner and said outer walls.

2. The gas detection apparatus according to claim 1, wherein the case cover is mounted on top of the case, the chamber is protruded from the case cover and is designed in such a manner that the sensor is installed in the chamber and also is provided with the set of holes on two longer sides thereof.

3. The gas detection apparatus according to claim 2, wherein the chamber has a band which is slightly extended to inside of the cover and is formed in a rectangle fashion to correspond to the connection portion, wherein the band is adapted to be submerged in a solidifiable liquid synthetic resin to be filled in the case.

4. The gas detection apparatus according to claim 3, wherein a shielding member is provided between the band and the connection portion.

5. The gas detection apparatus according to claim 3, wherein the case cover is provided with a flange formed along an edge portion thereof, wherein the flange is inserted into the case and tightly fixed at an inner wall of the case.

6. The gas detection apparatus according to claim 1, wherein the set of holes is provided on two opposite sides of the chamber of the case cover.

7. The gas detection apparatus according to claim 1, wherein each of the filters is made of a thin plate Gore-Tex, and is covered with a thin film synthetic resin material for passing vapor such as a Tetrafluorethylene.

8. The gas detection apparatus according to claim 7, wherein outside of the thin plate a metal knitting is provided.

9. The gas detection apparatus according to claim 1, wherein the outer and the inner walls of the case cap are provided with a plurality of slots, the slots of the outer wall being offset with respect to the slots of the inner wall.

10. The gas detection apparatus according to claim 9, wherein the chamber and the case cap have a rectangular cross section, and the outer wall and the inner wall of the case cap has four sides each, each of the four sides of the outer wall having one slot, and each of the two longer sides of the inner wall having two slots.

11. The gas detection apparatus according to claim 10, wherein a pair of stoppers is provided on the case cover at a position adjacent to two short sides of the chamber, each stopper being adapted to be inserted into a gap formed between the outer wall and the inner wall.

12. The gas detection apparatus according to claim 1, wherein the sensor is a metaloxide sensor such as a zinc-oxide sensor.

* * * * *